(12) United States Patent
Varbedian et al.

(10) Patent No.: US 11,716,304 B2
(45) Date of Patent: Aug. 1, 2023

(54) COMBINED READ AND REACTION MESSAGE

(71) Applicant: Snap Inc., Santa Monica, CA (US)

(72) Inventors: Jason Varbedian, Seattle, WA (US); Aleksandr Zhang, Seattle, WA (US)

(73) Assignee: Snap Inc., Santa Monica, CA (US)

( * ) Notice: Subject to any disclaimer, the term of this patent is extended or adjusted under 35 U.S.C. 154(b) by 150 days.

(21) Appl. No.: 17/445,147

(22) Filed: Aug. 16, 2021

(65) Prior Publication Data

US 2023/0047892 A1 Feb. 16, 2023

(51) Int. Cl.
*G06F 3/0482* (2013.01)
*H04L 51/52* (2022.01)
*H04L 51/234* (2022.01)

(52) U.S. Cl.
CPC ............ *H04L 51/52* (2022.05); *H04L 51/234* (2022.05)

(58) Field of Classification Search
None
See application file for complete search history.

(56) References Cited

U.S. PATENT DOCUMENTS

| 2014/0255002 A1 | 9/2014 | Baldwin et al. | |
| 2015/0180820 A1 | 6/2015 | Lee et al. | |
| 2018/0249218 A1* | 8/2018 | Sayman | H04L 51/52 |
| 2019/0386945 A1* | 12/2019 | Wills | H04L 51/42 |
| 2020/0322047 A1* | 10/2020 | Barnett | H04B 10/116 |
| 2020/0396187 A1* | 12/2020 | Woo | H04L 51/10 |
| 2022/0147206 A1* | 5/2022 | Zhai | G06F 3/0484 |

OTHER PUBLICATIONS

"International Application Serial No. PCT US2022 040438, International Search Report dated Dec. 6, 2022", 4 pgs.
"International Application Serial No. PCT US2022 040438, Written Opinion dated Dec. 6, 2022", 6 pgs.

* cited by examiner

*Primary Examiner* — Natisha D Cox
(74) *Attorney, Agent, or Firm* — Schwegman Lundberg & Woessner, P.A.

(57) ABSTRACT

Systems and methods are provided for sending a combined read and reaction message. The systems and methods perform operations comprising: receiving, from a server, a set of messages and one or more reactions exchanged between a plurality of users; determining that a given message has been presented on the client device to a first user of the plurality of users; determining that a given reaction of the one or more reactions has been presented on the client device to the first user; and transmitting, to the server by the one or more processors of the client device, a communication indicating that both the given message and the given reaction have been presented by the client device to the first user.

20 Claims, 10 Drawing Sheets

COMBINED READ AND REACTION MESSAGE

TECHNICAL FIELD

The present disclosure generally relates to the technical field of social networks. In particular, the present examples are generally directed to managing message synchronization.

BACKGROUND

As the popularity of social networking grows, social networks are expanding their capabilities. To improve ease of use, social networks are integrating more and more functions such that a user may accomplish many or even most of their computer-based tasks within the social network itself.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
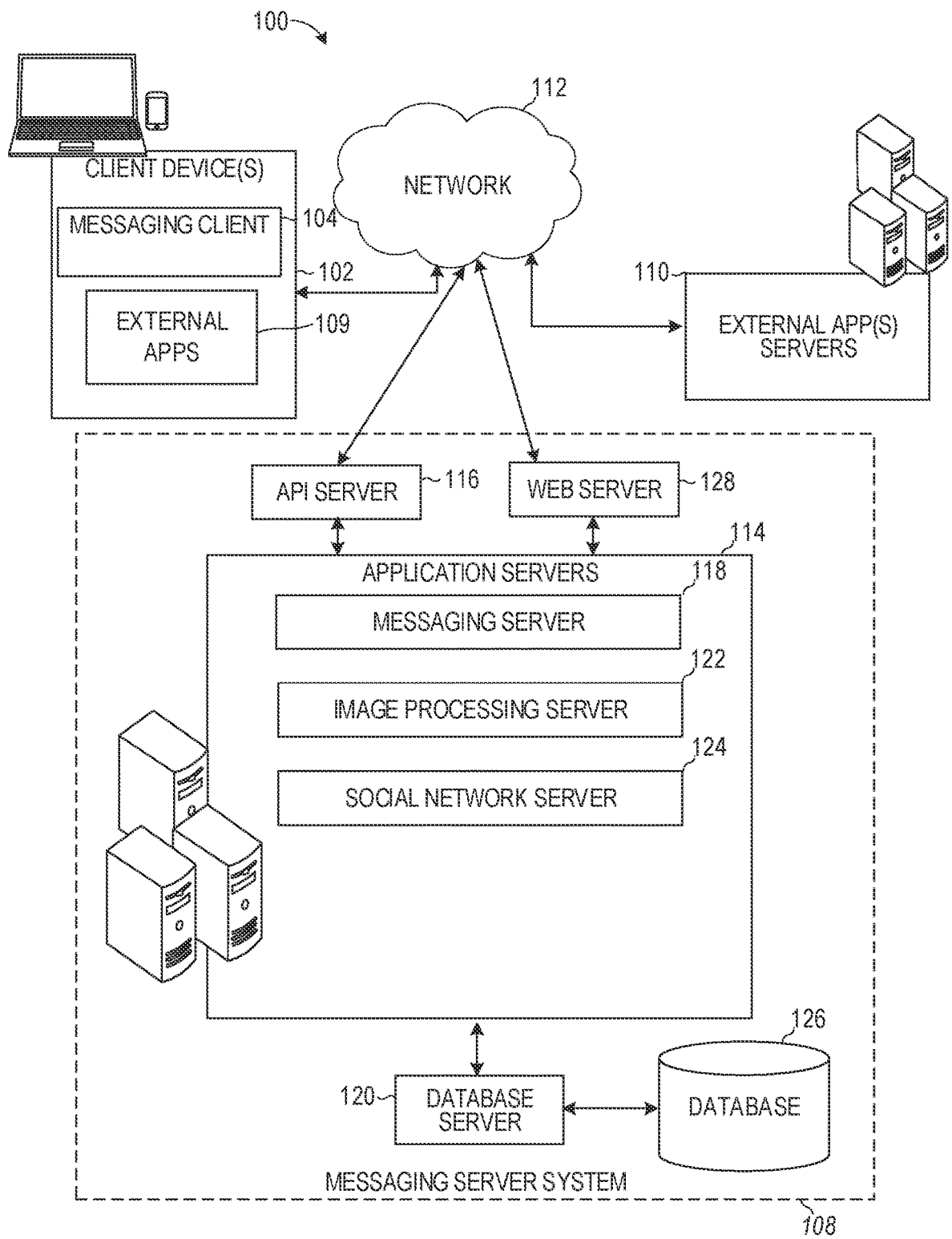
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Often, users consume media content, and specifically videos, on their mobile device. Such media content is typically exchanged in chat, communication, or conversation sessions between users or participants. Sometimes users log on and log off a server that maintains the contents of the chat sessions. In order to ensure that the latest chat messages, that were exchanged in the chat session while the user device has been disconnected from the server, are presented to the user, a user device synchronizes with the server. Typically, the server will send the content of all the messages that were exchanged while the user device was disconnected from the server. Some of these messages include reactions, such as thumbs up indicators, graphical content, augmented reality items, and so forth. Along with the actual contents of the messages and the reactions, additional metadata indicating read information is also provided. Such metadata is sometimes referred to as watermarks. Particularly, watermarks indicate whether a given message or reaction has been read by (presented by a client device of) a participant in a conversation session.

Synchronizing such additional metadata between a server and a client device consumes additional processing resources and network bandwidth, which makes synchronization sessions operate inefficiently. This is particularly the case because the watermarks for the reactions of the chat sessions are usually, sent by the server and by the client device out-of-band or separately from the watermarks for the individual messages that are exchanged. For example, as part of synchronizing data with a server, a client device can send one communication information to a server indicating which messages have been presented by the client device and can then send a separate communication indicating which reactions have been presented by the client device. As a result, such synchronizations can introduce further delays presenting the chat messages to an end user and can end up frustrating the users.

The disclosed examples improve the efficiency of using the electronic device by providing a system that efficiently synchronizes content (messages and reactions) and watermarks (metadata indicating whether such messages and reactions have been read or viewed) between a server and a client device. In some implementations, the watermarks are indicative of the point up to which messages/reactions have been read on a client device. In an example, the watermark can specify the latest message of a plurality of messages that has been read on the client device (e.g., presented to the user). This can be performed by the client device transmitting a timestamp of the latest message or a timestamp at which the latest message was read. Any message that precedes the latest message in the conversation is automatically marked as also being read based on the watermark specifying the latest message has been read. Specifically, any message that has a timestamp that precedes the timestamp received from the client device is automatically marked as read by the user associated with the client device.

According to the disclosed system, the client device generates a communication for transmission to a server that identifies messages (or a last message presented to a user by the client device) and that identifies each reaction that has been presented to the user by the client device. To further reduce the amount of data exchanged with the server and increase the overall efficiency of the electronic device, the disclosed system limits the inclusion of identification of reactions presented by the client device to those reactions that have not yet been presented by any other client device involved in the conversation session. Specifically, the disclosed system only sends watermarks to a server for reactions that are viewed or read for the first time by any participant in a given conversation session. For example, if the client device determines that a given reaction is associated with an asserted read state (indicating that at least one other conversation participant has already read, viewed, or had the reaction presented by the respective client device), the client device excludes sending a watermark for the given reaction to the server to reduce the amount of data traffic exchanged over the network. Namely, even though the client device presents the given reaction to the user of the client device for the first time, the client device only locally stores an indication that the given reaction has been viewed by the user and does not send such an indication to the server.

In this way, rather than sending to a server an indication that a reaction was read by a participant in the conversation session for each participant that is newly presented the reaction (is presented the reaction for the first time thereby asserting a read status for the reaction), the disclosed system only sends the indication that a reaction has been read for the very first participant in the conversation session that reads or views the reaction. For example, if there are five participants in the conversation, the read information for the reaction is sent to the server by a given client device of a first of the five participants when the given client device presents the reaction to the first participant and such read information is sent together with read information for other messages in the conversation presented to the first participant. This avoids having to send five separate communications to the server by the devices of each of the five participants when the respective devices present the reactions to the respective participants. This increases the efficiencies of the electronic device by reducing processing times and network bandwidth needed to accomplish a task.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108, and external app(s) servers 110 via a network 112 (e.g., the Internet). A messaging client 104 can also communicate with locally-hosted third-party applications 109 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video, or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, watermarks (combined indications of messages and reactions being read or presented to a user of a client device 102) and live event information, as examples. Data exchanges within the messaging system 100 are invoked and controlled through functions available via user interfaces of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages and reactions processed by the application servers 114. Similarly, a web server 128 is coupled to the application servers 114 and provides web-based interfaces to the application servers 114. To this end, the web server 128 processes incoming network requests over Hypertext Transfer Protocol (HTTP) and several other related protocols.

The API server 116 receives and transmits message data (e.g., watermarks, commands, and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including, for example, a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
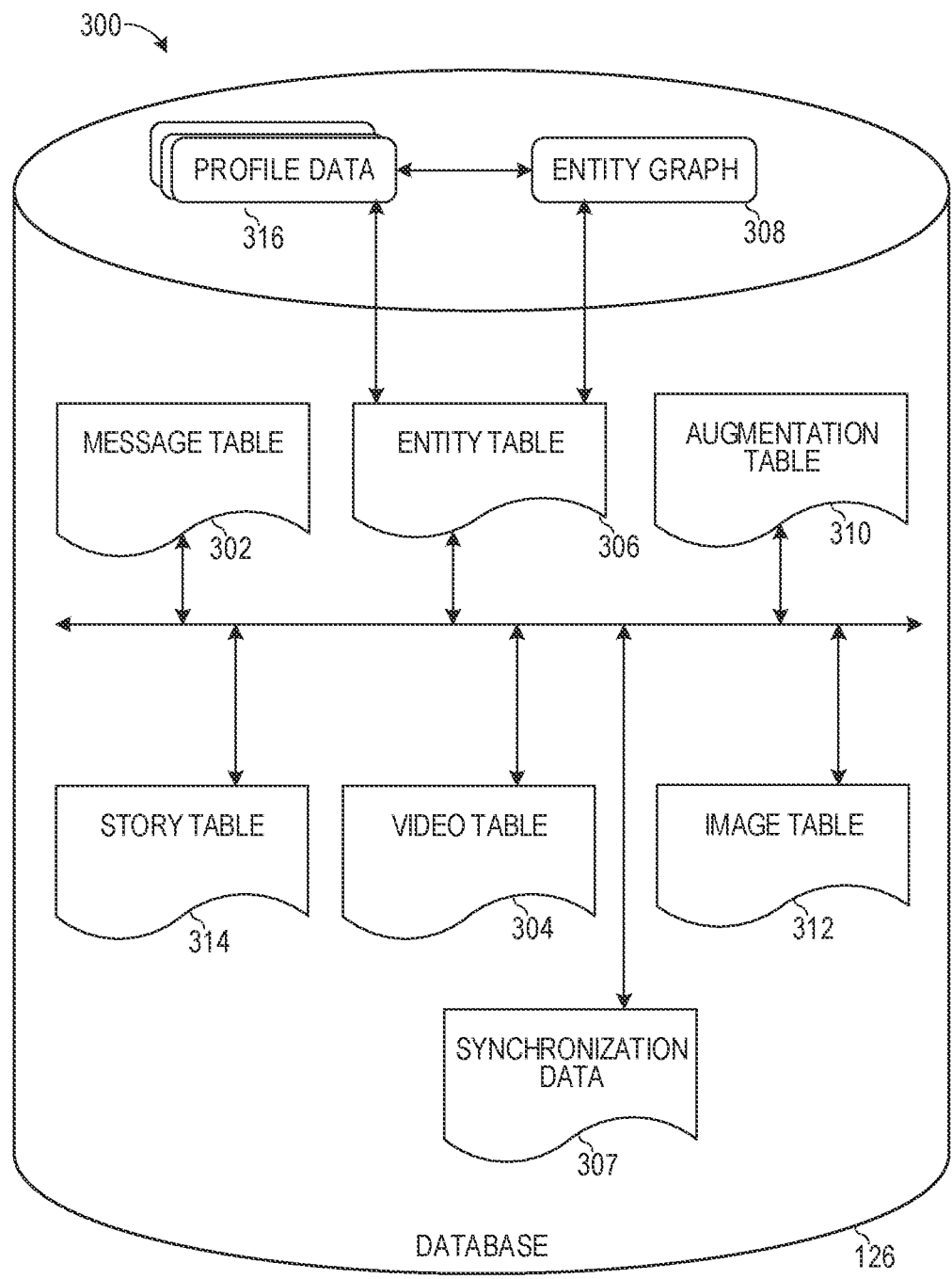
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following" and also the identification of other entities and interests of a particular user.

Returning to the messaging client 104, features and functions of an external resource (e.g., an external application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application an "applet") that is hosted on the client device 102 or remote of the client device 102 (e.g., on external app(s) servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

The messaging client 104 can present a conversation session interface that lists a plurality of messages and reactions exchanged by a plurality of users or participants to a conversation. In response to receiving input from a user to open a particular conversation, the messaging client 104 obtains a list of new messages and reactions from the messaging server 118 as part of synchronization data that includes identifiers of one or more messages exchanged in the communication session. In one example, the messaging client 104 provides a last update timestamp indicating the last time the messaging client 104 received an update to the conversation from the messaging server 118. The messaging server 118 searches for messages and reactions that have timestamps that follow the last update timestamp (e.g., messages and reactions that follow the previous time an update was sent to the messaging client 104) and transmits those messages and reactions that are part of the conversation to the messaging client 104 as part of the synchronization data. In one example, the messaging client 104 sends, to the messaging server 118, a synchronization request from a messaging application. The messaging server 118 identifies a given timestamp representing a previous time the messaging client 104 synchronized with the messaging server 118 and retrieves timestamps of content stored by the server. The messaging server 118 identities a set of timestamps that are later in time than the given timestamp and transmits the set of messages and one or more reactions to the messaging client 104 based on the set of timestamps. The messaging client 104 then presents the set of messages and one or more reactions as new messages and reactions to the user. In another example, the messaging server 118 automatically broadcasts updates to the conversation whenever the messaging server 118 receives a new message or reaction as part of the conversation. In this case, the messaging client 104 receives those updates and locally stores the messages and reactions for subsequent presentation to a user when input from a user is received to open the conversation.

In response to presenting a given message to a user indicating that the user has read the given message, the messaging client 104 locally updates a read state to an asserted state. This read state is locally stored as part of metadata associated with the message. In some examples, instead of storing the read state for each individual message, the messaging client 104 stores a timestamp indicating the last message read or presented to the user. This indicates that all messages that were received prior to and including the given message associated with the timestamp have been read. The messaging client 104 also determines whether one or more reactions are read or presented to the user. In response to identifying one or more reactions that are presented to the user, the messaging client 104 determines reaction identifiers (which uniquely identify each reaction) and updates the read state in the metadata of such reaction identifiers locally to an asserted state. This indicates that the reactions associated with the reaction identifiers have been read or presented to the user.

The messaging client 104 generates a message and reaction synchronization packet for transmission to the messaging server 118 to indicate to the message server 118 which messages have been read (e.g., presented to a user of the client device 102) and which reactions have been read (e.g., presented to a user of the client device 102). The messaging client 104 selectively includes a read status in the metadata for the reactions based on whether such reactions were previously read by any other participant to the conversation. For example, the messaging client 104, in generating the message and reaction synchronization packet, accesses, from the metadata, a read state of a given reaction that was presented to the user on the client device 102. The read state of the given reaction can be a global read state associated with the conversation. Namely, upon receiving the update from the messaging server 118, the messaging client 104 receives a read state in the metadata for each reaction. This can be received in the form of metadata that includes a reaction identifier and a read flag that is asserted (indicating that the reaction associated with the reaction identifier has been read by at least one user in the conversation) or is de-asserted (indicating that that the reaction associated with the reaction identifier has not been read by any user in the conversation).

In some implementations, the read flag for the reactions is maintained by the messaging server 118. Initially, when the messaging server 118 receives a reaction from a participant of the conversation, the messaging server 118 stores metadata for the reaction including a read flag for the reaction in a de-asserted state. The messaging server 118 receives a message and reaction synchronization packet from a given client device 102 that includes the reaction identifier of the reaction and an indication that the reaction has been read or presented to a user on the given client device 102. In response to determining that the message and reaction synchronization packet includes a reaction identifier that matches a reaction identifier of the reaction stored by the messaging server 118 in the metadata, the messaging server 118 determines that the associated read state is in a de-asserted state. In response to determining that the message and reaction synchronization packet specifies that the reaction identifier has been read or presented to the user of the given client device 102, the messaging server 118 updates the associated read state for the reaction identifier to an asserted state. The messaging server 118 also transmits an update to the client devices 102 of the participants indicating the update to the reaction read state and that identifies which messages have been read by the user of the given client device 102 (as indicated by the message and reaction synchronization packet received from the given client device 102). If the messaging server 118 subsequently receives a message and reaction synchronization packet from any other client device 102 that includes a reaction identifier and an update to the read state indicating that the reaction identifier has been read, the messaging server 118 does not again update the read state for the reaction identifier and does not include the update to the reaction identifier in the updates sent to the client devices 102. Namely, the messaging server 118 only updates the read state for a particular reaction identifier once (representing the very first time any user of the conversation reads the associated reaction). This reduces the amount of data traffic and updates that are sent to client devices 102 as the indication that the read state of a given reaction being changed is only sent once the very first time the reaction is read by any user of the conversation.

Similarly, the client device 102 checks the read state of the reaction presented to the user. In response to determining that the read state is asserted (indicating that at least one other participant to the conversation has read the same reaction), the client device 102 only locally updates the read state in the metadata of the reaction when the reaction is presented to the user and does not include such an update to the reaction read state in the message and reaction synchronization packet sent to the messaging server 118. In this example, the message and reaction synchronization packet sent to the messaging server 118 includes identifiers of messages read by the user of the client device 102 (e.g., a timestamp representing the last message read by the user of the client device 102 and indicating all prior messages have also been read) and does not include an identifier of the reaction that has been read by the user of the client device 102. This further reduces the amount of data traffic exchanged between the messaging server 118 and the client device 102 as the client device 102 only includes updates to the read state of a reaction if the reaction has been read for the very first time by a participant of the conversation and has not been previously presented or read by any other participant of the conversation. Specifically, in response to determining that the read state is de-asserted (indicating that none of the other participants to the conversation has read the same reaction that is now presented for the first time to the user of the client device 102), the client device 102 locally updates the read state of the reaction to an asserted state and includes such an update to the reaction read state in the message and reaction synchronization packet sent to the messaging server 118. In this example, the message and reaction synchronization packet sent to the messaging server 118 includes identifiers of messages read by the user of the client device 102 (e.g., a timestamp representing the last message read by the user of the client device 102 and indicating all prior messages have also been read) and also includes an identifier of the reaction that has been read by the user of the client device 102.

System Architecture

Figure 2:
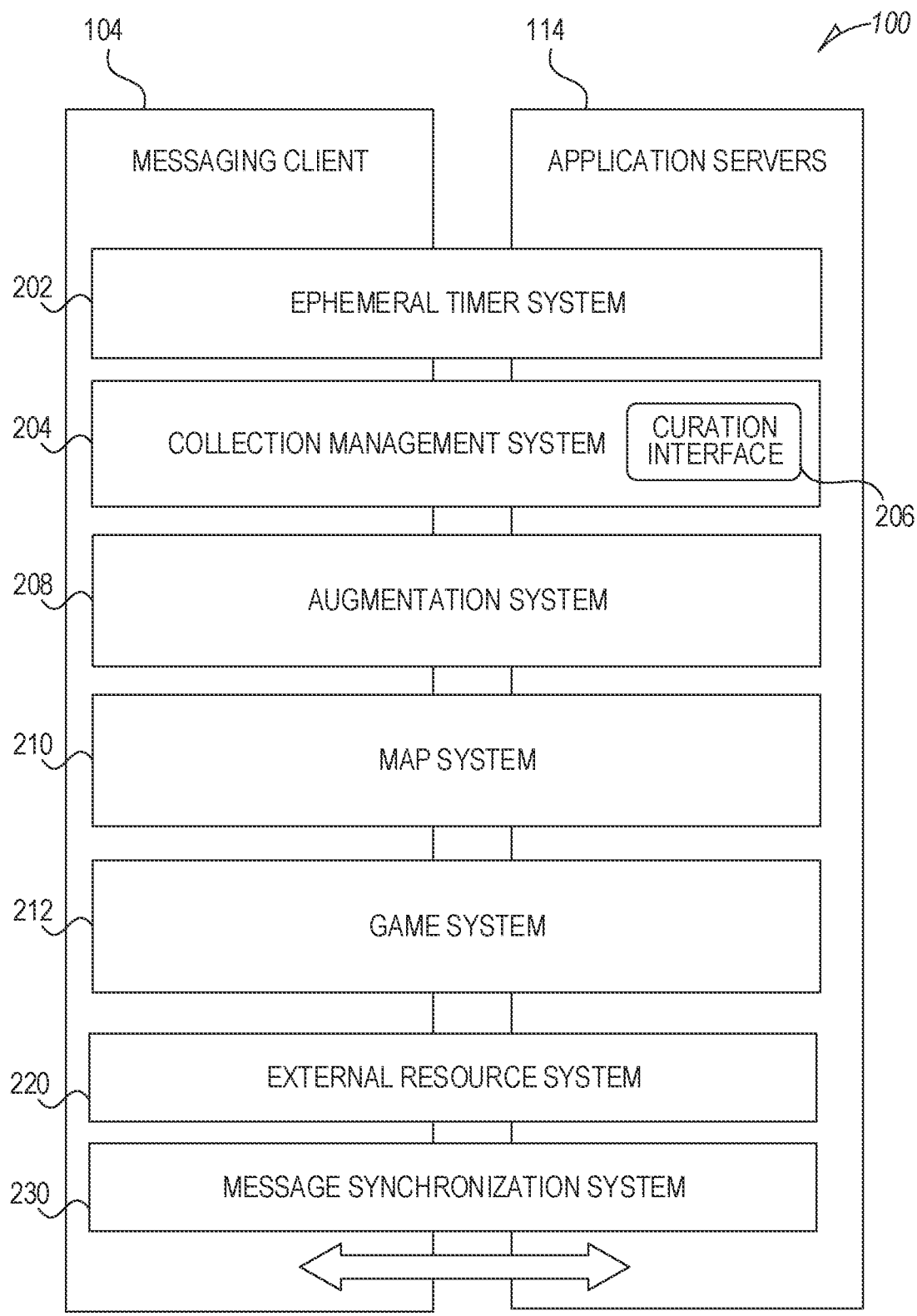
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, an external resource system 220, and a message synchronization system 230.

The ephemeral tinier system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter or augmented reality item) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. The media overlay in some cases is referred to as an augmented reality item. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to automatically select and activate an augmented reality experience related to an image captured by the client device 102. Once the augmented reality experience is selected, as the user scans images using a camera in the user's environment, one or more images, videos, or augmented reality graphical elements are retrieved and presented as an overlay on top of the scanned images. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The augmentation system 208 allows users to create custom media overlays or augmented reality items. Such media overlays may include one or more different feature types. For example, the media overlays may include the facial tracking-based features in which one or more augmented reality items are modified based on movement of facial features detected in a received or captured image or video. As another example, the media overlays may include the audio clip-based features in which a sound clip or audio clip is associated with one or more augmented reality items that are presented in a received or captured image or video. As another example, the media overlays may include the gyroscopic or accelerometer-based features in which one or more augmented reality items are modified based on movement of the client device 102 on which a received or captured image or video is displayed. The custom media overlays can be shared with other users of the messaging application. The other users can select to launch or access the custom media overlays. In response, the features of the custom media overlays are retrieved and used to augment or modify one or more images or videos presented on client devices of the other users.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104 and played with other users of the messaging system 100. The messaging system 100 further enables a particular user to invite other users to participate in the play of a specific game by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5)-based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes APIs with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as box art or other graphic) of the web-based external resource in the messaging client 104. Once the user selects the visual representation or instructs the messaging client 104 through a graphical user interface of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up a menu (e.g., animates a menu as surfacing from a bottom of the screen to a middle of or other portion of the screen) for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional (2D) avatars of users with or without different avatar characteristics). As another example, external resources that include small-scale versions of external applications (e.g., web-based versions of third-party applications) are provided with access to a second type of user data (e.g., payment information, 2D avatars of users, three-dimensional (3D) avatars of users, and avatars with various avatar characteristics). Avatar characteristics include different ways to customize a look and feel of an avatar, such as different poses, facial features, clothing, and so forth.

The message synchronization system 230 manages synchronization of messages and reactions exchanged in a communication session. As referred to herein, "reactions" include graphical elements, text, images, videos, emojis, or any other additional content that a given participant associates with a message exchanged in a conversation involving multiple participants. For example, a given participant can select a message received in a conversation and add a reaction (e.g., via user selection of a thumbs up icon) to associate with the message. In response, a unique reaction identifier is generated and used to display the reaction to other participants of the conversation as part of the conversation interface. The reactions can be presented alongside the associated message and/or in a separate region from the messages dedicated to presenting reactions received from the participants in the conversation.

In an example, the message synchronization system 230 establishes a communication session between a plurality of users or participants (e.g., a chat session in which multiple chat messages and/or reactions are exchanged). The messaging client 104 implemented on the client device 102 communicates with the message synchronization system 230 to receive messages and reactions transmitted as part of the communication session. Specifically, messages and reactions are sent from one user to another via the message synchronization system 230. The message synchronization system 230 keeps track of all the messages and reactions that are exchanged along with which messages have been read (e.g., by individual users—specifying which users have read and which users have not read a particular one of the messages) and which reactions have been read by any user in the conversation. The message synchronization system 230 sends updates to client devices 102 that are connected to the message synchronization system 230 in the form of a synchronization packet that includes message read status and, in some instances, reaction read status.

In some cases, the message synchronization system 230 stores data indicating a last time a given client device 102 or messaging client 104 was connected to and received an update from the message synchronization system 230. For example, the messaging client 104 may go offline (e.g., because a user closed the application and/or because of loss of Internet connectivity). Once the same messaging client 104 connects back to the message synchronization system 230, the message synchronization system 230 determines whether additional messages and reactions were exchanged or sent by users in the communication session. Particularly, the message synchronization system 230 retrieves the timestamp of the last time the given client device 102 was connected to the message synchronization system 230. The message synchronization system 230 compares the timestamp to timestamps of messages and reactions exchanged in the communication session to identify a set of messages and reactions that were exchanged after the timestamp of the last time the given client device 102 was connected to the message synchronization system 230. Namely, the message synchronization system 230 identifies timestamps that follow the timestamp of the last time the given client device 102 was connected to the message synchronization system 230.

The message synchronization system 230 generates synchronization data based on the identified set of messages and reactions that were exchanged after the last time the given client device 102 was connected to the message synchronization system 230. The message synchronization system 230 sends the synchronization data to the given client device 102. The given client device 102 updates the messages and reactions stored for a given conversation based on the synchronization data. Further details of the message synchronization system 230 are provided in connection with FIG. 5.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

Synchronization data 307 stores various information about messages and reactions exchanged in a communication session. Such information includes a timestamp representing the last time an update was sent to each client device 102 and/or messaging client 104 associated with a participant of a communication session (e.g., the timestamp of the last time the client device 102 or messaging client 104 was connected to the message synchronization system 230 in a synchronization session).

The information included in the synchronization data 307 includes metadata associated with each message and metadata associated with each reaction. The metadata includes a read state or read flag for each message that identifies a list of participants to a conversation that have already read or viewed the corresponding message. The metadata includes a read state or read flag for each reaction that is updated whenever a first participant in the conversation reads or views the corresponding reaction. The read state or read flag does not identify which users or participants have read the reaction and only indicates that at least one user has read or viewed the reaction. In some cases the read state or read flag of a reaction can include the identifiers of each user or participant that has read or viewed the reaction in a similar manner as the message read state or read flag. The synchronization data 307 is used by the messaging server 118 to send updates to the client devices 102 involved in the conversation. As an example, if the read status of a reaction has been updated to indicate a reaction has been read by a participant, the messaging server 118 sends synchronization data to the client devices 102 that includes message identifiers (with identities of users who have read specific messages) and that also includes a reaction identifier of the reaction that has been read by at least one participant. If the read status of a reaction is not updated (e.g., because the reaction has already been read by a participant), the messaging server 118 sends synchronization data to the client devices 102 that includes message identifiers (with identities of users who have read specific messages) and excludes a reaction identifier of the reaction that has been read by at least one participant.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a username, telephone number, address, and settings (e.g., notification and privacy settings), as well as a user-selected avatar representation (or collection of such avatar representations). A particular user may then selectively include one or more of these avatar representations within the content of messages communicated via the messaging system 100 and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104 based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying lenses or augmented reality experiences). An augmented reality content item may be a real-time special effect and sound that may be added to an image or a video.

As described above, augmentation data includes augmented reality content items, overlays, image transformations, augmented reality images, and similar terms that refer to modifications that may be applied to image data (e.g., videos or images). This includes real-time modifications, which modify an image as it is captured using device sensors (e.g., one or multiple cameras) of a client device 102 and then display on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a 3D mesh model of the object or objects and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of the object are calculated (e.g., using an Active Shape Model (ASM) or other known methods). Then, a mesh based on the characteristic points is generated for each of the at least one elements of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh; and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an ASM algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be presented as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
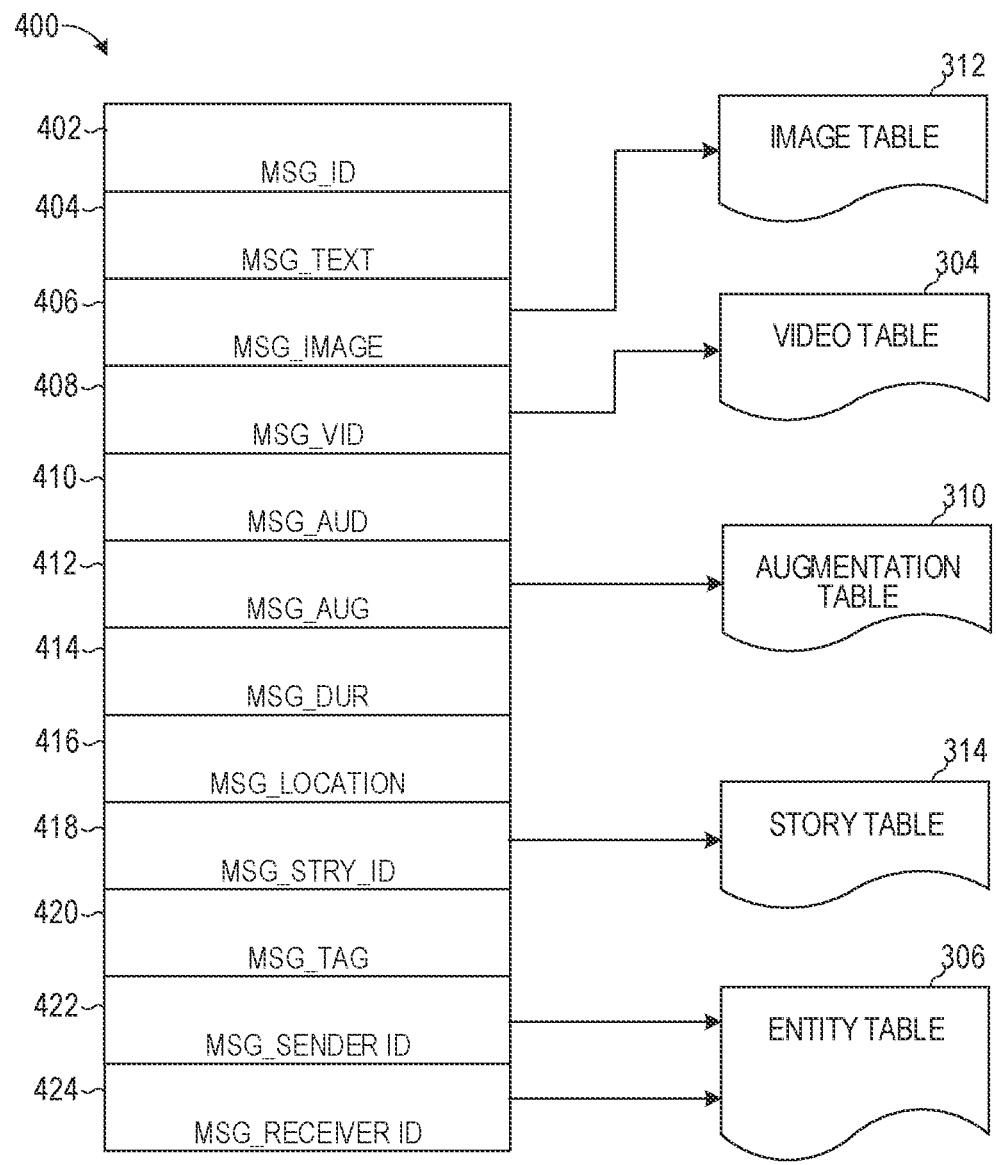
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

a. message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, with each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Message Synchronization System

Figure 5:
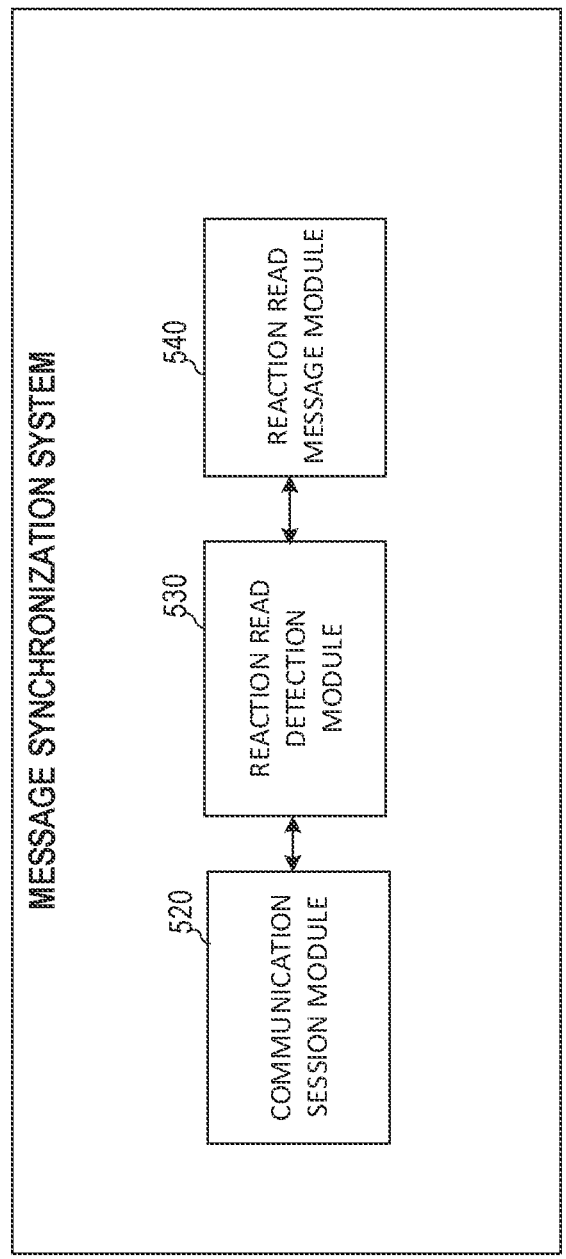
FIG. 5 illustrates the message synchronization system, in accordance with some examples.

FIG. 5 illustrates the message synchronization system 230, in accordance with some examples. The message synchronization system 230 includes a communication session module 520, a reaction read detection module 530, and a reaction read message module 540. The communication session module 520 maintains a conversation state between a plurality of participants. The communication session module 520 receives messages and reactions from client devices 102 of users in the conversation and stores such messages and reactions as part of the conversation state.

The communication session module 520 sends updates to the client devices 102 to represent newly received messages and reactions. In an example, the communication session module 520 receives, from a messaging client 104, a last update timestamp indicating the last time the messaging client 104 received an update to the conversation from the communication session module 520. The communication session module 520 searches for messages and reactions that have timestamps that follow the last update timestamp (e.g., messages and reactions that follow the previous time an update was sent to the messaging client 104) and transmits those messages and reactions that are part of the conversation to the messaging client 104 as part of synchronization data.

In one example, the communication session module 520 receives from a messaging client 104 a synchronization request. The communication session module 520 identifies a given timestamp representing a previous time the messaging client 104 synchronized with the communication session module 520 and retrieves timestamps of content stored by the server. The communication session module 520 identifies a set of timestamps that are later in time than the given timestamp and transmits the set of messages and one or more reactions to the messaging client 104 based on the set of timestamps. The messaging client 104 then presents the set of messages and one or more reactions as new messages and reactions to the user. In another example, the communication session module 520 automatically broadcasts updates to the conversation whenever the communication session module 520 receives a new message or reaction as part of the conversation. In this case, the messaging client 104 receives those updates and locally stores the messages and reactions for subsequent presentation to a user when input from a user is received to open the conversation.

The communication session module 520 can generate a message and reaction synchronization packet that represents which messages in the conversation have been read by which users and which reactions have been read by any user in the conversation. To generate the message and reaction synchronization packet, the communication session module 520 communicates with the reaction read detection module 530 to determine which reactions have previously been read by any user in the conversation. For example, after the communication session module 520 sends a set of messages and reactions to the client devices 102 of the users of the conversation, the communication session module 520 receives indications from the client devices 102 of which messages have been read (e.g., in the form of a timestamp of the last read message) and, in some cases, whether the reactions were read. The communication session module 520 maintains a read state for each message and each reaction in the metadata associated with the messages and reactions.

In one example, a given client device 102 can receive input from a given user to open the conversation interface in which the messages and reactions were exchanged. In response, the given client device 102 presents the set of messages and reactions including a given message to a user. The given client device 102 updates a last read timestamp corresponding to the current time the conversation interface has been presented to the user. This represents that the user has read all of the messages exchanged in the conversation interface that have timestamps that precede the last read timestamp. In other implementations, the messaging client 104 updates a read flag for each message that is presented to the user in the metadata associated with each message indicating that the user has read the messages including the given message.

Figure 6:
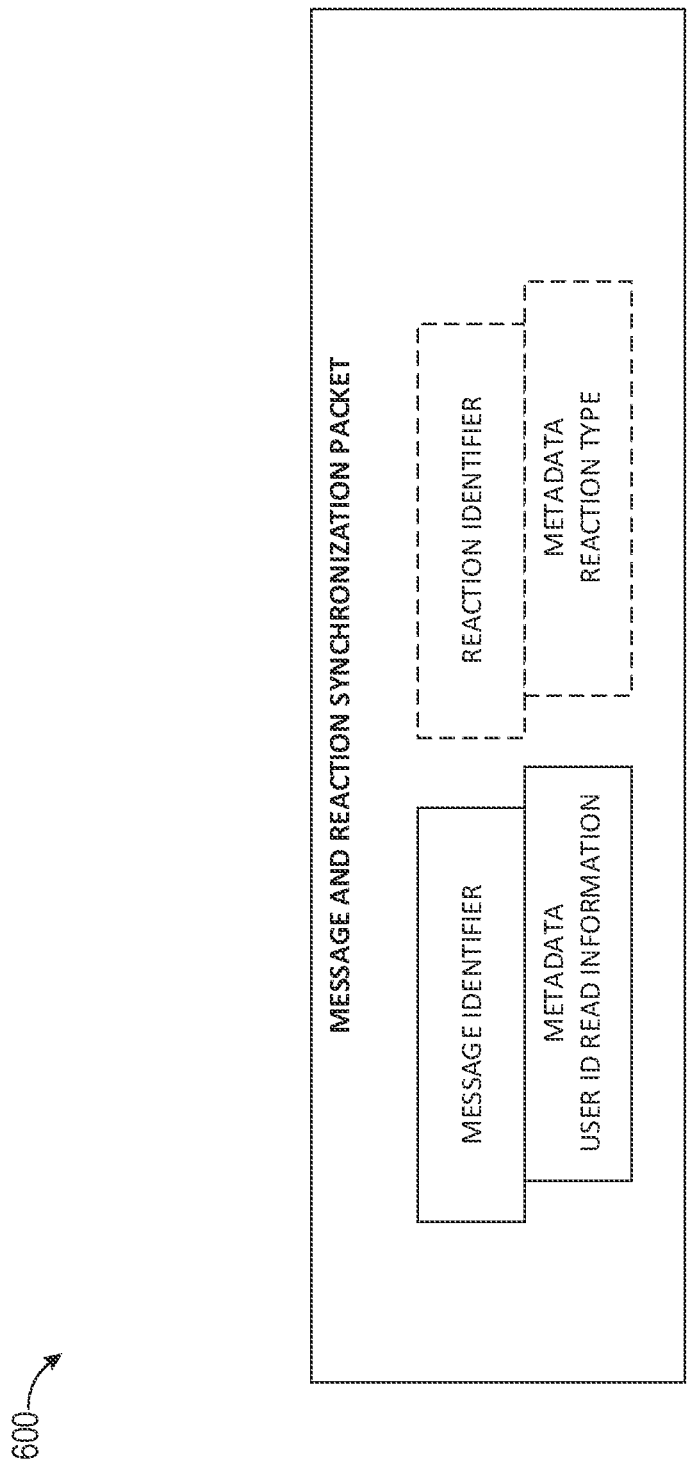
FIG. 6 is a diagrammatic representation of a message and reaction synchronization packet of the message synchronization system, in accordance with some examples.

The messaging client 104 also determines whether one or more reactions are read or presented to the user. In response to identifying one or more reactions that are presented to the user, the messaging client 104 determines reaction identifiers (which uniquely identify each reaction) and updates the read state in the metadata of such reaction identifiers locally to an asserted state. This indicates that the reactions associated with the reaction identifiers have been read or presented to the user. In some examples, the messaging client 104 accesses read state information associated with the reactions received from the communication session module 520 to determine whether a given reaction has been read by any other user in the conversation. Namely, if the read state of a given reaction identifier is de-asserted, the messaging client 104 determines that the reaction associated with the given reaction identifier has not been read by any other user. In such circumstances, in addition to locally updating the read state for the reaction identifier to an asserted state, the messaging client 104 adds the reaction identifier and update to the read state to a message and reaction synchronization packet 600 (FIG. 6). If the read state of a given reaction identifier received from the communication session module 520 is asserted, the messaging client 104 determines that the reaction associated with the given reaction identifier has been read by at least one other user in the conversation. In such circumstances, the messaging client 104 only locally updates the read state for the reaction identifier to an asserted state and prevents or excludes the reaction identifier from the message and reaction synchronization packet 600 (FIG. 6).

The message and reaction synchronization packet 600 includes various fields, such as a message identifier field and corresponding metadata for the message identifier. The message and reaction synchronization packet 600 optionally includes a reaction identifier and corresponding metadata for the reaction identifier. Namely, if the reaction is being read for the very first time by a particular user in the conversation (e.g., no other user has read the reaction or been presented the reaction and the particular user is the only user who up to the present time read the reaction), the messaging client 104 obtains the reaction identifier and includes such identifier in the reaction identifier field of the message and reaction synchronization packet 600. In this case, the messaging client 104 also includes metadata that describes the reaction type and that specifies an asserted read state or read flag for the reaction. The messaging client 104 together with the reaction identifier field, includes a message identifier field that lists all the new messages that have been presented to the user of the messaging client 104 since the last time an update was sent to the communication session module 520. In some cases, the message identifier field includes a current timestamp representing the current time and indicative of the fact that all messages exchanged in the conversation prior to the current timestamp have been read. The message and reaction synchronization packet 600 also includes metadata for the messages that are exchanged that specifies the user identifier of the user who has read the messages and the reactions.

In an example, if the reaction is being read for the very first time by a particular user in the conversation but has also previously been read by at least one other user in the conversation, the messaging client 104 does not include the reaction identifier field in the message and reaction synchronization packet 600 and only includes the message identifier field and corresponding metadata. In such cases, the messaging client 104 locally stores an indication that the reaction associated with the reaction identifier (read by at least one other user in the conversation) has been read by the user of the messaging client 104. To determine if the reaction has been read by at least one other user in the conversation, the messaging client 104 accesses metadata associated with the reaction that has been received from the communication session module 520 and determines that the read state associated with the reaction is in the asserted state. Namely, upon receiving a message and reaction synchronization packet 600 from a second client device 102 indicating that the reaction has been read by a second user, the reaction read message module 540 transmits a message to the client device 102 of the first user that includes a read state that is in the asserted state. The client device 102 of the first user stores the asserted read state for the reaction indicating that at least one other user has read the reaction. The client device 102 uses this asserted read state to control the inclusion or exclusion of the reaction identifier in the message and reaction synchronization packet 600 sent to the communication session module 520 when the reaction and messages are read by the first user.

The messaging client 104 generates message and reaction synchronization packet 600 for transmission to the messaging server 118 to indicate to the message server 118 which messages have been read (e.g., presented to a user of the client device 102) and which reactions have been read (e.g., presented to a user of the client device 102). The messaging client 104 selectively includes a read status in the metadata for the reactions based on whether such reactions were previously read by any other participant to the conversation. For example, the messaging client 104, in generating the message and reaction synchronization packet 600, accesses, from the metadata, a read state of a given reaction that was presented to the user on the client device 102. The read state of the given reaction can be a global read state associated with the conversation. Namely, upon receiving the update from the messaging server 118, the messaging client 104 receives a read state in the metadata for each reaction. This can be received in the form of metadata that includes a reaction identifier and a read flag that is asserted (indicating that the reaction associated with the reaction identifier has been read by at least one user in the conversation) or is de-asserted (indicating that that the reaction associated with the reaction identifier has not been read by any user in the conversation).

The communication session module 520 receives the message and reaction synchronization packet 600 from the messaging client 104 that includes the reaction identifier of the reaction and an indication that the reaction has been read or presented to a user on the client device 102. In response to determining that the message and reaction synchronization packet 600 includes a reaction identifier that matches a reaction identifier of the reaction stored by the communication session module 520 in the metadata, the communication session module 520 provides such information to the reaction read detection module 530 to determine if the currently stored associated read state is in a de-asserted state. In response to the reaction read detection module 530 determining that the message and reaction synchronization packet 600 specifies that the reaction identifier has been read or presented to the user of the given client device 102, the reaction read detection module 530 updates the associated read state for the reaction identifier to an asserted state. The reaction read detection module 530 instructs the reaction read message module 540 to transmit an update to the client devices 102 of the participants indicating the update to the reaction read state and that identifies which messages have been read by the user of the given client device 102 (as indicated by the message and reaction synchronization packet 600 received from the client device 102).

If the communication session module 520 subsequently receives a message and reaction synchronization packet 600 from any other client device 102 that includes a reaction identifier and an update to the read state indicating that the reaction identifier has been read, then the communication session module 520 instructs the reaction read message module 540 to prevent transmitting a reaction read message that includes the update to the reaction identifier in the updates sent to the client devices 102. Namely, the reaction read message module 540 only sends updates to the read state to client device 102 for a particular reaction identifier once (representing the very first time any user of the conversation reads the associated reaction). This reduces the amount of data traffic and updates that are sent to client devices 102 as the indication that the read state of a given reaction being changed is only sent once the very first time the reaction is read by any user of the conversation.

Figure 7:
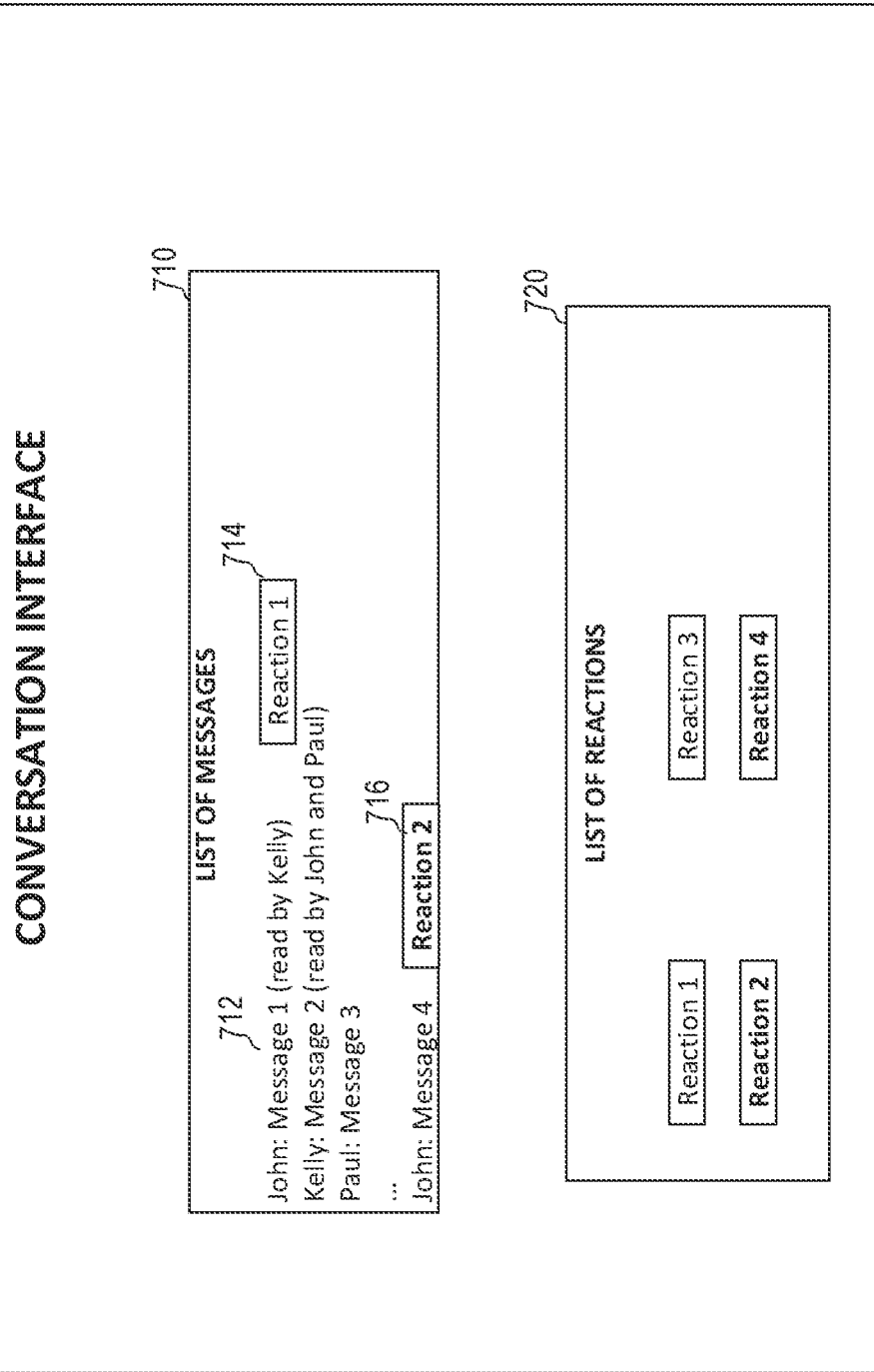
FIG. 7 is a diagrammatic representation of a graphical user interface of the message synchronization system, in accordance with some examples.

FIG. 7 is a diagrammatic representation of a graphical user interface 700 of the message synchronization system 230, in accordance with some examples. The graphical user interface 700 includes a conversation interface with a message region 710 and a reactions region 720. The message region 710 includes a set of messages exchanged in a conversation between a plurality of users. The reactions region 720 includes a list of reactions exchanged between the plurality of users. The message region 710 and the reactions region 720 visually distinguish or present visual indicators to identify which messages and reactions have been read by other users in the conversation and which messages and reactions have not been read by other users. In an example, reactions that have been read by at least one other user in the conversation are presented with a first visual indicator (e.g., a first color or in bold or italics) and reactions that have not been read by any other user in the conversation are presented with a second visual indicator (e.g., a second color).

As an example, the message region 710 includes a list of messages 712. The message region 710 can also include a first reaction 714 and a second reaction 716. Specifically, the message synchronization system 230 may receive an update from a first user (e.g., John) that includes a first message. In response, the message synchronization system 230 transmits the first message to second and third users (e.g., Kelly and Paul). The message synchronization system 230 can receive a first reaction 714 from the second user. In response, the message synchronization system 230 presents the first reaction 714 to the users including the first, second, and third users. The message synchronization system 230 can also store a read state for the first message and the first reaction 714.

The client device 102 of the first user can receive input from the first user to open the conversation interface. In response, the client device 102 of the first user presents the first message and any other messages and reactions received as part of the conversation. The client device 102 also presents the first reaction 714. The client device 102 can access metadata of the first reaction 714 to determine if the read state of the first reaction 714 is asserted or de-asserted. In response to determining that the read state of the first reaction 714 is de-asserted (meaning no other user has read the first reaction 714), the client device 102 of the first user updates the local metadata for the first reaction 714 indicating the first reaction 714 has been read by the first user. The client device 102 also generates a message and reaction synchronization packet 600 that includes the identifier of the first reaction 714 and identifiers of other messages read by the first user.

Upon receiving the message and reaction synchronization packet 600 from the client device 102 of the first user, the message synchronization system 230 sends updates to the client devices 102 of the second and third users that indicate the first reaction 714 has been read by one of the users of the conversation and that identifies the messages read by the first user. In response to receiving the update from the message synchronization system 230, the client device 102 of the second user updates the metadata for the first reaction 714 to indicate one of the users of the conversation has read the first reaction 714. In this way, when the client device 102 of the second user receives a request to access the conversation interface, the client device 102 presents the first reaction 714 to the second user. Because this is the first time the second user is presented with the first reaction 714, the client device 102 only locally updates the read state of the first reaction 714 to indicate that the second user has viewed or read the first reaction 714 and does not include the identifier of the first reaction 714 in the message and reaction synchronization packet 600. The client device 102 of the second user sends a message and reaction synchronization packet 600 that identifies the list of messages read by the second user to the message synchronization system 230.

A second message and a second reaction 716 may be presented to a third user on the client device 102 of the third user. In some cases, the second reaction 716 may be associated with a read status that is de-asserted indicating that no other participant in the conversation has read the second reaction 716. The first reaction 714 may be associated with a read status that is asserted (e.g., because the first user was presented with the first reaction 714). In response, the client device 102 of the third user presents the first reaction 714 with a first visual indicator (e.g., in a first color) and presents the second reaction 716 with a second visual indicator (e.g., in a second color) to visually distinguish reactions that have already been read by one or more other users from reactions that have not been read by any user in the conversation. After the third user reads the second reaction 716, the client device 102 of the third user generates a message and reaction synchronization packet 600 that includes the identifier of the second reaction 716 and identifiers of other messages read by the third user.

In some examples, the reactions region 720 presents a list of all of the reactions that were exchanged as part of the conversation. The reactions presented in the reactions region 720 can be provided in addition to or in alternative to presenting the reactions within the message region 710. In some cases, the reactions presented in the reactions region 720 represent historically of the reactions exchanged as part of the conversation. The client device 102 allows a user to see a subset of reactions exchanged as part of the conversation in the message region 710 for only the messages included in the message region 710. At the same time (or simultaneously with the reactions displayed in the message region 710), the client device 102 displays the same subset of reactions and one or more additional reactions exchanged in the conversation in association with messages that are not currently displayed or in view in the message region 710. For example, a first set of messages can be displayed in the message region 710. A first set of reactions that were made by users in the conversation in association with the first set of messages can also be displayed together with the first set of messages in the message region 710. A second set of reactions that were made by users in the conversation in association with a second set of messages (or the conversation itself and not associated with any particular message) that may not be currently displayed in the message region 710 are presented in the reactions region 720. The reactions region 720 can also display the first set of reactions that are currently displayed in the message region 710 or can exclude the first set of reactions that are currently displayed in the message region 710. A user can select any reaction that is displayed in the reactions region 720 or the message region 710 to view the read state of the reaction (e.g., indicating whether the user has or has not read the reaction previously).

The reactions presented in the reactions region 720 can similarly be visually distinguished with visual indicators (e.g., using a first color and a second color) on the basis of whether any given reaction has or has not been read by one or more other participants in the conversation.

Figure 8:
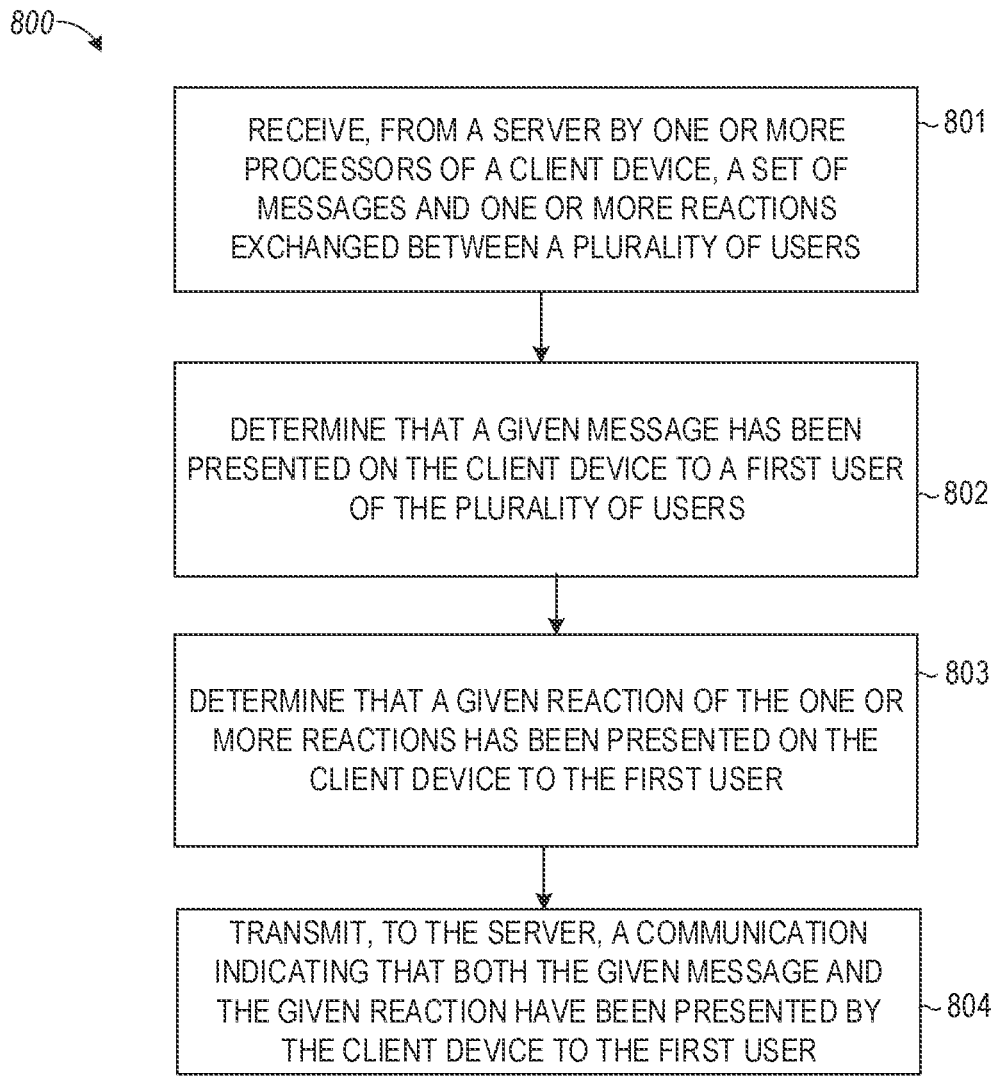
FIG. 8 is a flowchart illustrating example operations of the messaging application, in accordance with some examples.

FIG. 8 is a flowchart illustrating example operations of the messaging client 104 in performing process 800, according to example examples. The process 800 may be embodied in computer-readable instructions for execution by one or more processors such that the operations of the process 800 may be performed in part or in whole by the functional components of the messaging server system 108; accordingly, the process 800 is described below by way of example with reference thereto. However, in other examples at least some of the operations of the process 800 may be deployed on various other hardware configurations. The operations in the process 800 can be performed in any order, in parallel, or may be entirely skipped and omitted.

At operation 801, the messaging client 104 receives, from a server, a set of messages and one or more reactions exchanged between a plurality of users, as discussed above.

At operation 802, the messaging client 104 determines that a given message has been presented on the client device to a first user of the plurality of users, as discussed above.

At operation 803, the messaging client 104 determines that a given reaction of the one or more reactions has been presented on the client device to the first user, as discussed above.

At operation 804, the messaging client 104 transmits, to the server by the one or more processors of the client device, a communication indicating that both the given message and the given reaction have been presented by the client device to the first user, as discussed above.

Machine Architecture

Figure 9:
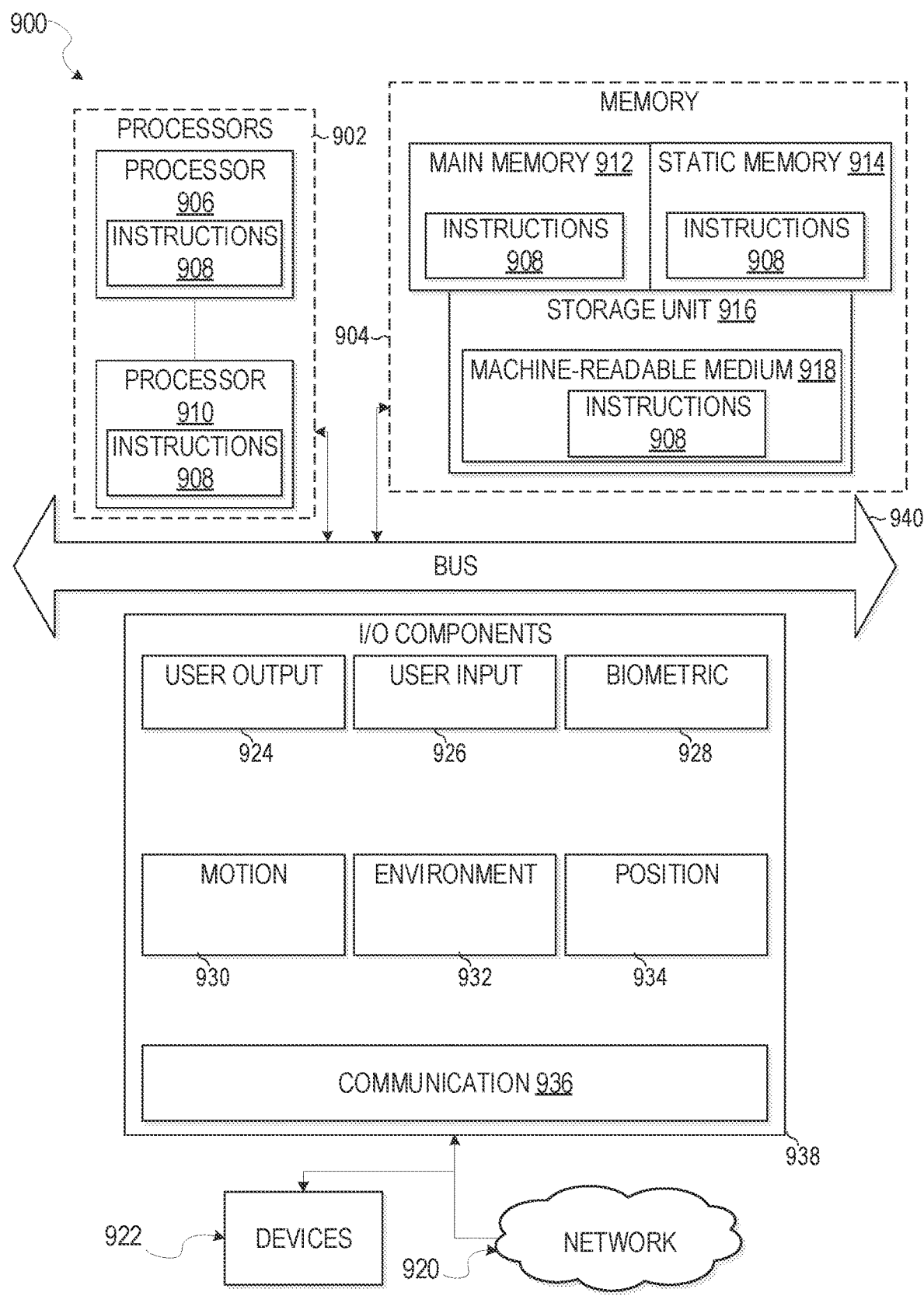
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 908 (e.g., software, a program, an application, an apples, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described.

The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 902, memory 904, and input/output (I/O) components 938, which may be configured to communicate with each other via a bus 940. In an example, the processors 902 (e.g., a Central Processing Unit (CPU), a Reduced Instruction Set Computing (RISC) Processor, a Complex Instruction Set Computing (CISC) Processor, a Graphics Processing Unit (CPU), a Digital Signal Processor (DSP), an Application Specific Integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single-core, a single processor with multiple cores (e.g., a multi-core processor), multiple processors with a single core, multiple processors with multiples cores, or any combination thereof.

The memory 904 includes a main memory 912, a static memory 914, and a storage unit 916, all accessible to the processors 902 via the bus 940. The main memory 904, the static memory 914, and the storage unit 916 store the instructions 908 embodying any one or more of the methodologies or functions described herein. The instructions 908 may also reside, completely or partially, within the main memory 912, within the static memory 914, within a machine-readable medium 918 within the storage unit 916, within at least one of the processors 902 (e.g., within the processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body, gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope).

The environmental components 932 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing, camera), or even triple, quad, or penta rear camera configurations on the front and rear sides of the client device 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface component or another suitable device to interface with the network 920. In further examples, the communication components 9:36 may include wired communication components, wireless communication components, cellular communication components, Near Field. Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and memory of the processors 902) and storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., HTTP). Similarly, the instructions 908 may be transmitted or received using a transmission medium via a coupling (e.g., a peer-to-peer coupling) to the devices 922.

Software Architecture

Figure 10:
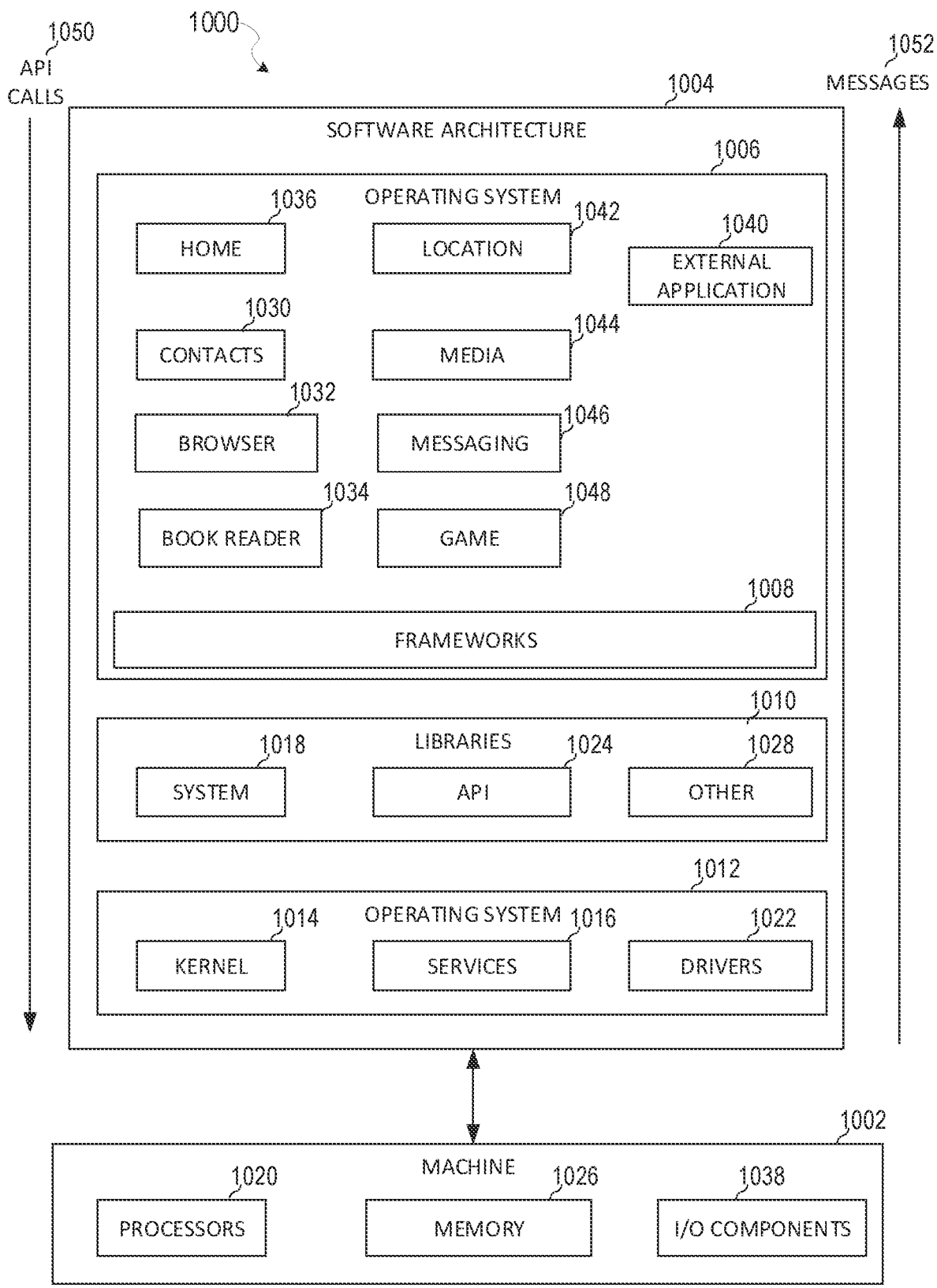
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications, such as an external application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the external application 1040 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the external application 1040 can invoke the API calls 1050 provided by the operating system 1012 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, PDAs, smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fid) network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 902 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example examples, the processors or processor-implemented components may be located in a single geographic location (e.g., within a home environment, an office environment, or a server farm). In other example examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims,

What is claimed is:

1. A method comprising:
receiving, from a server by one or more processors of a client device, a set of messages and one or more reactions exchanged between a plurality of users;
determining that a given message has been presented on the client device to a first user of the plurality of users;
determining that a given reaction of the one or more reactions has been presented on the client device to the first user; and
transmitting, to the server by the one or more processors of the client device, a communication indicating that both the given message and the given reaction have been presented by the client device to the first user.

2. The method of claim 1, further comprising establishing a communication session between the plurality of users, wherein the set of messages and the one or more reactions are received as part of synchronization data comprising identifiers of one or more messages exchanged in the communication session.

3. The method of claim 1, further comprising:
determining that the given reaction has not been presented by other client devices to any other user of the plurality of users; and
generating the communication in response to determining that the given reaction has not been presented by other client devices to any other user of the plurality of users.

4. The method of claim 3, further comprising:
accessing metadata associated with the given reaction comprising a read state; and
determining that the read state of the given reaction in the metadata is de-asserted.

5. The method of claim 1, further comprising:
determining that a second reaction of the one or more reactions has been presented on the client device to the first user;
determining that the second reaction has been presented by one or more other client devices to at least one oilier user of the plurality of users;
generating a second communication that indicates that a second message has been presented by the client device to the first user; and
excluding from the second communication an indication that the second reaction has been presented on the client device to the first user in response to determining that the second reaction has been presented by the one or more other client devices to the at least one other user of the plurality of users.

6. The method of claim 5, further comprising:
accessing metadata associated with the second reaction comprising a read state; and
determining that the read state of the second reaction in the metadata is asserted.

7. The method of claim 5, further comprising:
locally asserting a read state for the second reaction to indicate that the second reaction of the one or more reactions has been presented on the client device to the first user without transmitting the indication that the second reaction has been presented on the client device to the server.

8. The method of claim 1, further comprising:
modifying a read state of the given reaction to an asserted state to indicate that the given reaction has been read by at least one user of the plurality of users.

9. The method of claim 1, further comprising:
receiving, from the server, a packet that includes metadata associated with the set of messages and the one or more reactions indicating respective read states of the set of messages and the one or more reactions.

10. The method of claim 9, wherein the metadata comprises message identifiers of the set of messages, reaction identifiers of the one or more reactions, and reaction types of the one or more reactions.

11. The method of claim 9, wherein the read state of a first message of the set of messages includes one or more identifiers of a subset of the plurality of users to whom the first message was presented; and
wherein the read state of the one or more reactions excludes identifiers of users to whom the one or more reactions were presented.

12. The method of claim 1, further comprising:
sending, to the server, a synchronization request from a messaging application;
causing the server to identify a given timestamp representing a previous time the messaging application synchronized with the server;
causing the server to retrieve timestamps of content stored by the server;
causing the server to identify a set of timestamps that are later in time than the given timestamp; and
receiving the set of messages and one or more reactions based on the set of timestamps.

13. The method of claim 1, wherein the given message is exchanged in a conversation; and
wherein determining that the given message has been presented on the client device to the first user comprises:
obtaining a first timestamp representing a last tune the conversation has been opened on the client device;
receiving a request on the client device to open the conversation;
in response to receiving the request, determining that a second timestamp of the given message is later than the first timestamp; and
in response to determining that the second timestamp of the given message is later than the first timestamp:
updating a read state of the given message to an asserted state; and
generating the communication.

14. The method of claim 1, wherein the one or more reactions are exchanged in a conversation; and
wherein determining that the given reaction has been presented on the client device to the first user comprises:
receiving a request on the client device to open the conversation;
in response to receiving the request on the client device to open the conversation, determining that a read state associated with the given reaction is de-asserted; and
in response to determining that the read state associated with the given reaction is de-asserted:
updating the read state of the given reaction to an asserted state; and
adding the read state of the given reaction to the communication.

15. A system comprising:
a processor of a client device configured to perform operations comprising:
receiving, from a server, a set of messages and one or more reactions exchanged between a plurality of users;
determining that a given message has been presented on the client device to a first user of the plurality of users;
determining that a given reaction of the one or more reactions has been presented on the client device to the first user; and
transmitting, to the server by the one or more processors of the client device, a communication indicating that both the given message and the given reaction have been presented by the client device to the first user.

16. The system of claim 15, wherein the operations further comprise establishing a communication session between the plurality of users, wherein the set of messages and the one or more reactions are received as pail of synchronization data comprising identifiers of one or more messages exchanged in the communication session.

17. The system of claim 15, wherein the operations further comprise:

determining that the given reaction has not been presented by other client devices to any other user of the plurality of users; and generating the communication in response to determining that the given reaction has not been presented by other client devices to any other user of the plurality of users.

18. The system of claim 17, wherein the operations further comprise:

accessing metadata associated with the given reaction comprising a read state; and determining that the read state of the given reaction in the metadata is de-asserted.

19. The system of claim 15, wherein the operations further comprise:

determining that a second reaction of the one or more reactions has been presented on the client device to the first user;

determining that the second reaction has been presented by one or more other client devices to at least one other user of the plurality of users;

generating a second communication that indicates that a second message has been presented by the client device to the first user; and excluding from the second communication an indication that the second reaction has been presented on the client device to the first user in response to determining that the second reaction has been presented by the one or more other client devices to the at least one other user of the plurality of users.

20. A non-transitory machine-readable storage medium that includes instructions that, when executed by one or more processors of a client device, cause the client device to perform operations comprising:

receiving, from a server, a set of messages and one or more reactions exchanged between a plurality of users;

determining that a given message has been presented on the client device to a first user of the plurality of users;

determining that a given reaction of the one or more reactions has been presented on the client device to the first user; and transmitting, to the server by the one or more processors of the client device, a communication indicating that both the given message and the given reaction have been presented by the client device to the first user.

* * * * *

UNITED STATES PATENT AND TRADEMARK OFFICE
CERTIFICATE OF CORRECTION

PATENT NO. : 11,716,304 B2
APPLICATION NO. : 17/445147
DATED : August 1, 2023
INVENTOR(S) : Varbedian et al.

It is certified that error appears in the above-identified patent and that said Letters Patent is hereby corrected as shown below:

In the Claims

In Column 35, Line 22, in Claim 5, delete "oilier" and insert --other-- therefor In Column 36, Line 15, in Claim 13, delete "tune" and insert --time-- therefor In Column 36, Line 63, in Claim 16, delete "pail" and insert --part-- therefor Signed and Sealed this
Twelfth Day of November, 2024

Katherine Kelly Vidal
*Director of the United States Patent and Trademark Office*